(12) United States Patent
Dehu et al.

(10) Patent No.: US 9,062,627 B2
(45) Date of Patent: Jun. 23, 2015

(54) METHOD FOR CONTROLLING ELECTRIC MOTORS OF A THRUST REVERSER

(75) Inventors: Michel Philippe Dehu, Tournefeuille (FR); Fabrice Henri Emile Metezeau, Montivillers (FR); Eric Lecossais, Virville (FR); Gilles Le Gouellec, Paris (FR); Regis Meuret, Chatou (FR); Sebastien Vieillard, La Chapelle Gauthier (FR)

(73) Assignee: AIRCELLE, Gonfreville L'Orcher (FR)

(*) Notice: Subject to any disclaimer, the term of this patent is extended or adjusted under 35 U.S.C. 154(b) by 1131 days.

(21) Appl. No.: 12/527,125

(22) PCT Filed: Jan. 25, 2008

(86) PCT No.: PCT/FR2008/000090
§ 371 (c)(1),
(2), (4) Date: Aug. 13, 2009

(87) PCT Pub. No.: WO2008/110677
PCT Pub. Date: Sep. 18, 2008

(65) Prior Publication Data
US 2010/0115915 A1 May 13, 2010

(30) Foreign Application Priority Data
Feb. 14, 2007 (FR) .................................... 07 01058

(51) Int. Cl.
*F02K 1/76* (2006.01)

(52) U.S. Cl.
CPC ............... *F02K 1/763* (2013.01); *Y02T 50/671* (2013.01); *F05D 2270/62* (2013.01)

(58) Field of Classification Search
CPC .... F02K 1/763; F05D 2270/62; Y02T 50/671
USPC .................... 60/226.2, 230, 204; 244/110 B; 239/265.19, 265.25–265.27
See application file for complete search history.

(56) References Cited

U.S. PATENT DOCUMENTS 3,259,826 A * 7/1966 Paul .............................. 318/454
4,286,303 A * 8/1981 Genheimer et al. .......... 318/798
(Continued)

FOREIGN PATENT DOCUMENTS

| EP | 0843089 | 5/1998 |
| FR | 2872223 | 12/2005 |
| WO | 03010430 | 2/2003 |
| WO | WO 2007/057524 | * 5/2007 |

OTHER PUBLICATIONS

FR 2872223 machine translation done Jul. 19, 2012.*
(Continued)

*Primary Examiner* — Ted Kim
(74) *Attorney, Agent, or Firm* — Brinks Gilson & Lione

(57) ABSTRACT

The invention relates to a method for controlling an electric motor actuating a mobile hood provided in a thrust reverser for a turboreactor, said method being characterized in that it comprises steps of: determining the operating state of the electric motor; interrupting the supply of the electric motor if said motor is not in operation during a defined period of time; reactivating the electric motor after an idle period and repeating the previous steps or definitively stopping the motor if the steps have already been repeated a pre-defined number of times. The invention also relates to a method for managing the electrical supply of a motor provided in a device arranged in the vicinity of a turboreactor.

6 Claims, 3 Drawing Sheets

(56) References Cited

U.S. PATENT DOCUMENTS

| | | | |
|---|---|---|---|
| 7,042,180 B2* | 5/2006 | Terry et al. | 318/400.21 |
| 7,562,520 B2* | 7/2009 | Dehu et al. | 60/204 |
| 8,151,550 B2* | 4/2012 | Dehu et al. | 60/226.2 |
| 2003/0066283 A1* | 4/2003 | Ahrendt | 60/204 |

OTHER PUBLICATIONS

French Search Report FR0701058 Dated Nov. 22, 2007.
International Search Report PCT/FR2008/000090; Dated Jun. 22, 2009.

\* cited by examiner

METHOD FOR CONTROLLING ELECTRIC MOTORS OF A THRUST REVERSER

TECHNICAL FIELD OF THE INVENTION

The present invention relates to a method for controlling an electric motor actuating a movable hood fitted to a thrust reverser for a turbojet.

BRIEF DESCRIPTION OF RELATED ART

The role of a thrust reverser when an aircraft lands is to improve the braking capacity of an aircraft by redirecting forward at least a portion of the thrust generated by the turbojet. In this phase, the reverser obstructs the gas exhaust nozzle and directs the exhaust flow from the engine toward the front of the nacelle, thereby generating a counter-thrust which adds to the braking of the aircraft wheels.

The means used to achieve this reorientation of the flow vary depending on the type of reverser. However, in all cases, the structure of a reverser comprises movable hoods that can be moved between, on the one hand, a deployed position in which they open in the nacelle a passageway designed for the diverted flow, and, on the other hand, a retracted position in which they close this passageway. These movable hoods may also fulfill a function of deflection or simply of activation of other deflection means.

In grid reversers, for example, the movable hoods slide along rails so that, by moving backward during the opening phase, they reveal deflection vane grids placed in the thickness of the nacelle. A system of link rods connects this movable hood to blocking doors which are deployed inside the exhaust channel and close off the direct flow outlet. In door reversers, on the other hand, each movable hood pivots so as to close off the flow and divert it and is therefore active in this reorientation.

Usually, these movable hoods are actuated by hydraulic or pneumatic cylinders which require a network for transporting a pressurized fluid. This pressurized fluid is conventionally obtained either by tapping off air from the turbojet in the case of a pneumatic system or by tapping from the hydraulic circuit of the aircraft. Such systems require considerable maintenance because the slightest leak in the hydraulic or pneumatic network can be difficult to detect and risks having damaging consequences both on the reverser and on other portions of the nacelle. Furthermore, because of the reduced space available in the front frame of the reverser, installing and protecting such a circuit are particularly awkward and bulky.

To alleviate the various disadvantages associated with the pneumatic and hydraulic systems, the manufacturers of thrust reversers have sought to replace them and as far as possible fit their reversers with electromechanical actuators that are lighter and more reliable. Such a reverser is described in document EP 0 843 089.

However, electromechanical actuators also have several disadvantages that need to be resolved to benefit fully from the advantages that they provide in terms of gain in weight and bulk.

One of these major disadvantages lies in the fact that an electric motor does not support blockage situations. Specifically, when an electric motor is accidentally blocked, its power supply is no longer converted into motive power but is dissipated in the form of heat which risks damaging the power electronics of the motor or its windings. Such a situation is unacceptable in the envisaged application and must be absolutely avoided.

In the case of an aborted landing, the movable hoods must be able to be closed again in under six seconds after triggering by the pilot. It is known that the aerodynamic stresses will be sufficiently low for an electric motor delivering 35 Nm only approximately three seconds after the triggering of the maneuver. A blocking of the motor is therefore only temporary.

The electric motor is activated, for example, one second after triggering. At this moment, the aerodynamic stresses are still much greater than what the electric motor can deliver and the latter therefore sustains a blockage causing the increase in its temperature. The period of time after which these stresses descend below the power that the electric motor can deliver cannot be known precisely and a late triggering would cause a damaging loss of time because of the six-second requirement to be observed in the case of the aborted landing. Similar time requirements are also defined for the other cases of deployment and retraction.

However, the movable hood of the reverser must be held in the position in which the motor is blocked and must not return to the position corresponding to the beginning of the sequence under the effect of external loads. This holding in position must make it possible to terminate the sequence in the initial direction of the command as soon as the blockage has disappeared.

It should be noted that the waiting time before being able to activate the electric motor in total safety is not precisely known and depends on the scenarios encountered.

BRIEF SUMMARY OF THE INVENTION

The invention provides a method for controlling an electric motor actuating a movable hood fitted to a thrust reverser for a turbojet, characterized in that it comprises the steps designed to:
  determine the state of operation of the electric motor,
  disconnect the power from the electric motor if the latter does not operate for a certain time,
  reactivate the electric motor after a rest period and repeat the preceding steps or permanently shut down the latter if these steps have already been repeated a predefined number of times.

Therefore, by alternating periods of operation of the electric motor and periods of rest allowing it to cool, the overheating of the electric motor and of the power electronics is prevented. These operations are repeated several times until the blockage disappears and the initial sequence can continue. In the contrary case, if the blockage is not temporary, the motor is permanently shut down without having overheated. It will be sufficient simply to release it during the maintenance of the aircraft once the latter is on the ground, but it will not be necessary to replace a burned out electric motor. The method according to the invention therefore makes it possible to protect the electric motor and its power electronics and to have a reduced volume of maintenance.

Preferably, the period of rest and/or the period of nonoperation are predetermined. Clearly, the real values of these periods depend on the electric motor concerned and on its power supply and its insulation. The determination of the maximum power supply time in the event of blockage and of the cooling time necessary may be easily determined by those skilled in the art.

Advantageously, the period of rest and/or the period of nonoperation are determined on the basis of the temperature of the motor determined by an appropriate sensor so as to obtain an asymptote of the temperature of the power electronics and of the motor or more simply by a theoretical study.

Preferably, the method according to the invention comprises an additional step designed to analyze a parameter representative of the pressure in the stream of the turbojet and to set the power delivered by the electric motor in consequence. If the analysis of the representative parameter reveals that only a certain power should be necessary in order to actuate the movable hood, the electric motor will heat up less rapidly than if it is required to deliver its maximum power.

Advantageously, the method according to the invention comprises an additional step preceding the shutdown of the electric motor in the event of nonoperation, this step being designed to control the electric motor to deliver its maximum power if the latter has not already been applied. Specifically, the increase in power of the motor makes it possible to increase the chances of unblocking the motor and continuing the opening or closing sequence.

BRIEF DESCRIPTION OF THE DRAWINGS

The embodiment of the invention will be better understood with the aid of the detailed description that is given below with respect to the appended drawing in which.

DETAILED DESCRIPTION OF THE INVENTION

Before describing in detail an embodiment of the invention, it is important to specify that the method described is not limited to one type of reverser in particular. Although illustrated via a grid reverser, it could be applied with reversers of different design, notably reversers with doors.

Figure 1:
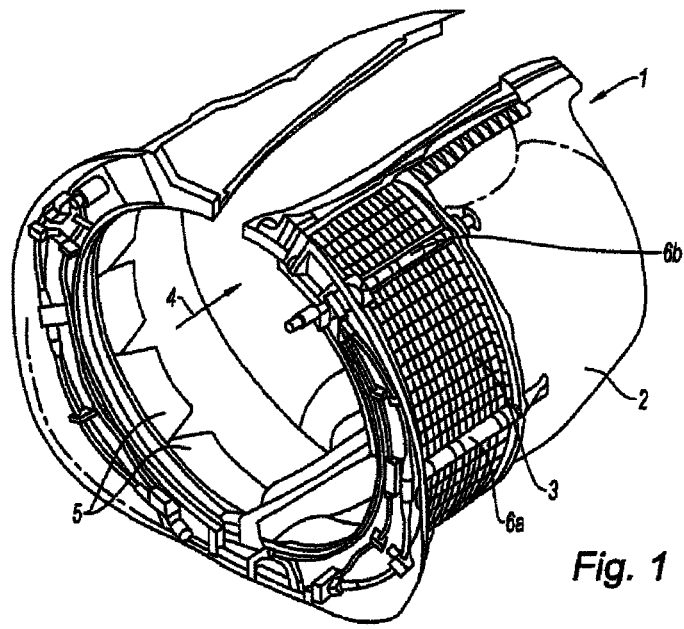
FIG. 1 is a partial schematic view in perspective of a nacelle incorporating a grid thrust reverser.

FIG. 1 shows a partial schematic view of a nacelle incorporating a thrust reverser 1. The turbojet is not shown. This thrust reverser 1 has a structure comprising two semicircular movable hoods 2 that are capable of sliding to reveal deflection vane grids 3 placed between the movable hoods 2 and a section for the passage of the air flow 4 to be deflected. Blocking doors 5 are placed inside the structure in order to be able to pivot and pass from a position in which they do not prevent the passageway of the air flow 4 to a position in which they block this passageway. In order to coordinate the opening of the movable hoods 2 with a blocking position of the blocking doors 5, the latter are mechanically connected to the movable hood 2 by hinges and to the fixed structure by a system of link rods (not shown).

The movable hoods 2 are moved along the outside of the structure by a set of cylinders 6a, 6b mounted on the front frame inside which are housed an electric motor 7 and flexible transmission shafts 8a, 8b respectively connected to the cylinders 6a, 6b in order to actuate them.

Figure 2:
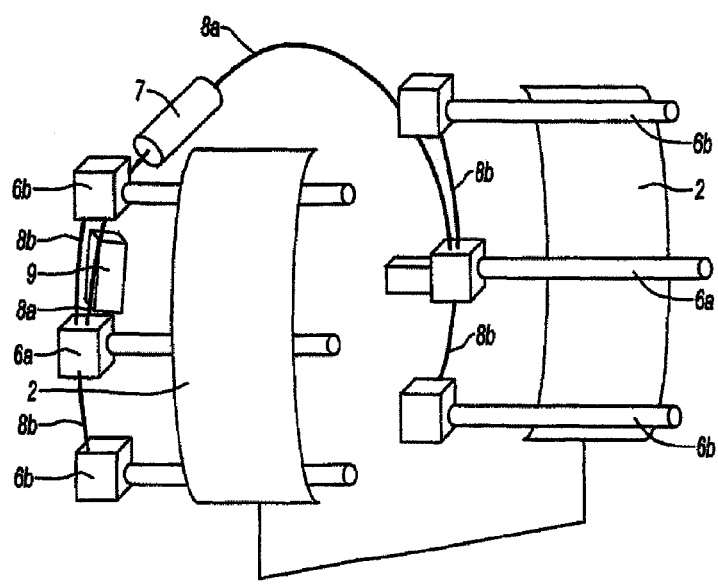
FIG. 2 is a schematic representation of the movable hoods and of their actuation system.

The system for actuating the movable hoods 2 is shown only in FIG. 2. Each movable hood 2 can be moved in translation under the action of three cylinders 6a, 6b, comprising a central cylinder 6a and two additional cylinders 6b, actuated by a single electric motor 7 connected to a control interface 9. The power delivered by the electric motor 7 is first of all distributed to the central cylinders 6a by means of two flexible transmission shafts 8a, and then to the additional cylinders 6b via flexible transmission shafts 8b.

Figure 3:
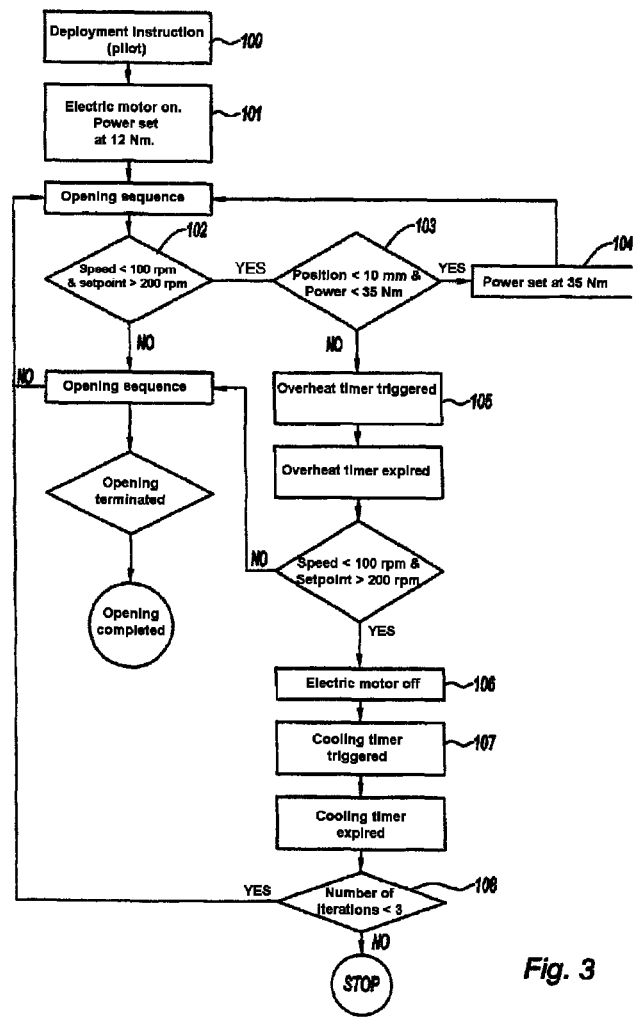
FIG. 3 is a diagram representing the steps in the operation of a control method according to the invention.

A diagram showing the steps of a method according to the invention for the opening of the thrust reverser 1 in normal conditions is shown in FIG. 3.

Initially, the instruction 100 is given by the pilot to deploy the reverser. The electric motor 7 is switched on during a step 101 and follows a determined opening sequence. The state of operation of the electric motor is regularly tested during the opening sequence during a step 102. If the real speed of rotation of the electric motor 7 is less than 100 revolutions per minute when it receives a speed setpoint of more than 200 revolutions per minute, the electric motor 7 is considered to be blocked and the steps of the method according to the invention are applied.

First of all, a first step 103 consists in analyzing the movement of the movable hood 2. If the latter has slid less than 10 mm, then it is possible that the blockage encountered is due to stresses that are too high for the electric motor 7 delivering an initially low motor torque, in this instance 10 Nm. In this case, a setpoint fixing a higher torque for the electric motor 7, in this instance 35 Nm, is then sent via an instruction 104. In the contrary case, the motor torque remains fixed at 10 Nm.

It is possible to add a step making it possible to distinguish between several situations, notably between a normal deployment and an Aborted Take Off (ATO) deployment, corresponding to a situation of urgency and of high mechanical stresses. In the case of an ALD deployment, the power of the motor will be immediately fixed at its maximum value, namely 35 Nm, while, in the case of a normal deployment, a first test is carried out at a motor power that is low but theoretically sufficient before applying a higher power. The same applies for closure sequences between a closure in a normal situation and an emergency closure in the case of an Aborted Landing (ALD).

Once the blockage has been detected and the appropriate torque fixed, an instruction 105 triggers an overheat timer. When the overheat timer reaches a predetermined duration, in this instance 0.5 second as a minimum, without the electric motor 7 running, then the power supply of the electric motor 7 is switched off by an instruction 106. This step 106 triggers a cooling timer via an instruction 107. When the cooling timer reaches a cooling period predetermined according to the electric motor 7 used, the electric motor 7 is switched on again by an instruction 108. The reactivation 108 of the electric motor 7 takes place only a limited number of times. This number may be either predetermined and counted down, or be linked to a certain operating time of the described loop. Notably, the reactivation 108 of the electric motor 7 and the cyclical ratio between the switch-off and reactivation are calculated so as to obtain an asymptote of the temperature of the motor and/or of the motor control elements making it possible to maintain an average torque in the direction of the pilot's request without achieving temperature stresses that are able to damage the elements of the system while covering a minimum time in the aircraft allowing it to achieve a "GO AROUND" and to land again.

When the number of iterations is reached or the time of execution of the loop has expired, without the electric motor being unblocked, then its power supply is permanently switched off. It is clearly possible to provide information messages transmitted to the pilot of the aircraft and informing him that a maintenance operation must be performed.

Figure 4:
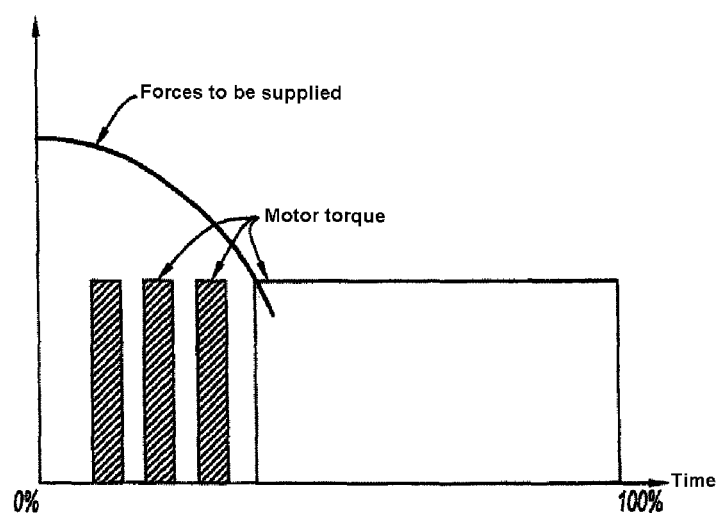
FIG. 4 is a curve representing, as a function of time, on the one hand, the reduction of the resistant forces associated with the reduction of the motor speed when there is a command to deploy or reclose a thrust reverser and, on the other hand, the activity of an electric motor subjected to the control method according to the invention.

FIG. 4 illustrates the application of the method according to the invention on closure of the thrust reverser 1 in the case of aborted landing, at a high turbojet speed. In such a situation, the movable hoods must be able to be closed again in less than six seconds after triggering by the pilot and the electric motor 7 must deliver a much greater power than in the case of a normal closure in order to overcome the high aerodynamic stresses due to a turbojet operating at high speed.

However, as shown in the curve of FIG. 4, these aerodynamic stresses reduce fairly rapidly. It is known that the aerodynamic stresses will be low enough for an electric motor delivering 35 Nm only approximately three seconds after the triggering of the maneuver.

To close the movable hoods 2 again in such a situation, two solutions can be envisaged: either using an electric motor adapted to the initially high stresses, or using an electric motor 7 that is less powerful and activating it only when the stresses have reduced sufficiently. It should be noted here that the weight of the equipment is an essential point in aviation construction and that the reverser is the heaviest subassembly of the nacelle. It is therefore advantageous to seek to reduce this weight as much as possible, while observing the standards of safety and strength. Consequently, the solution involving using a less powerful electric motor is to be preferred.

However, and as has already been explained, the moment of activation of the electric motor cannot be determined precisely. Furthermore, activating this electric motor too soon would risk causing it to overheat if the stresses to be overcome were still too high. The method according to the invention is then particularly appropriate. As shown in FIG. 4, the electric motor 7 is switched on, for example, one second after triggering and operates intermittently until the aerodynamic stresses have reduced sufficiently. A method according to the invention makes it possible to stop the power supply of the electric motor 7 after a certain blockage time, thereby preventing it from overheating, and to allow it to cool down before repeating an attempt. Moreover, the differences relative to the theoretical decrease in the aerodynamic stresses are also taken into account, and it is therefore possible to use an electric motor that is less powerful and therefore smaller and lighter, while minimizing the risks of overheating.

Although the invention has been described with reference to particular embodiments, it is clear that it is in no way limited thereto and that it includes all the technical equivalents of the means described and their combinations if the latter are included in the context of the invention.

The invention claimed is:

1. In a thrust reverser comprising at least one movable hood that can be moved between a deployed position in which said movable hood opens a passageway in a nacelle designed for a diverted flow and a retracted position in which said movable hood closes the passageway, said movable hood being actuated by at least one electromechanical actuator associated with at least one electric motor connected to a control interface that operates said motor according to a method comprising:
   actuating said movable hood fitted to the thrust reverser for a turbojet;
   determining a state of operation of the electric motor by testing its speed of rotation during the step of actuating the movable hood;
   disconnecting power to the electric motor if the electric motor does not operate for a certain time; and
   reactivating the electric motor after a rest period of the electric motor and repeating the preceding steps or permanently shutting down the power to the electric motor and its power electronics if the preceding steps have already been repeated a predefined number of times,
   in an aborted landing, in order to overcome the aerodynamic stresses, closing the movable hood after triggering the electric motor by operating the motor intermittently according to the preceding steps above until the aerodynamic stresses are reduced; and in an aborted takeoff, opening the movable hood after triggering the electric motor by operating the motor.

2. The thrust reverser according to claim 1, wherein the period of rest and/or the period of nonoperation are predetermined.

3. The thrust reverser according to claim 1, wherein the period of rest and/or the period of nonoperation are determined on the basis of a temperature of the motor and/or of power electronics, as determined by at least one sensor.

4. The thrust reverser according to claim 1 further comprising analyzing a parameter representative of a pressure in a stream of the turbojet and setting the power delivered by the electric motor accordingly.

5. The thrust reverser according to claim 1 further comprising, preceding the shutdown of the electric motor in the event of nonoperation, delivering a higher power if the shutdown step has not already been applied.

6. The thrust reverser according to claim 5, wherein said delivering step is applied only if the movable hood has completed a travel of less than a predetermined length.

* * * * *